United States Patent Office 3,200,724
Patented Aug. 17, 1965

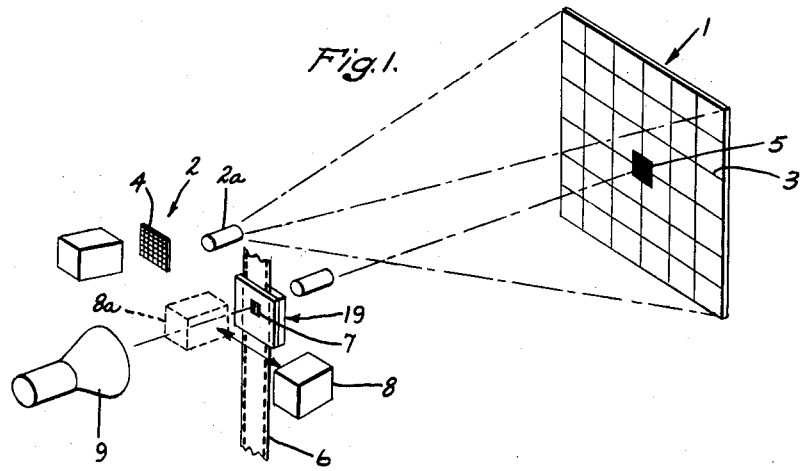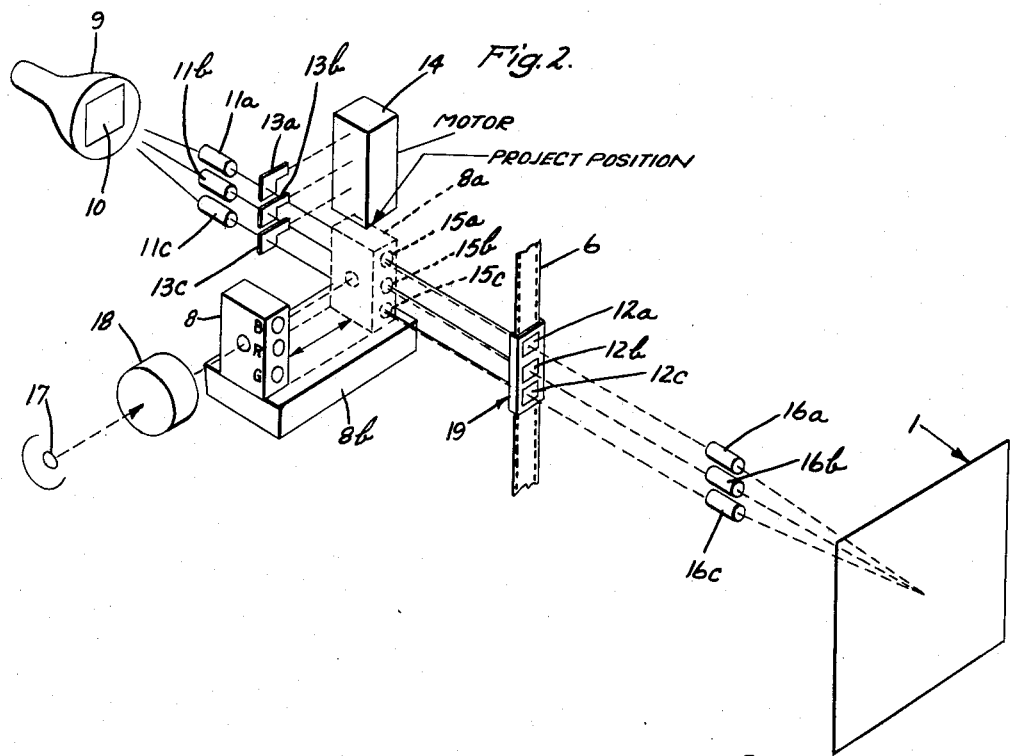

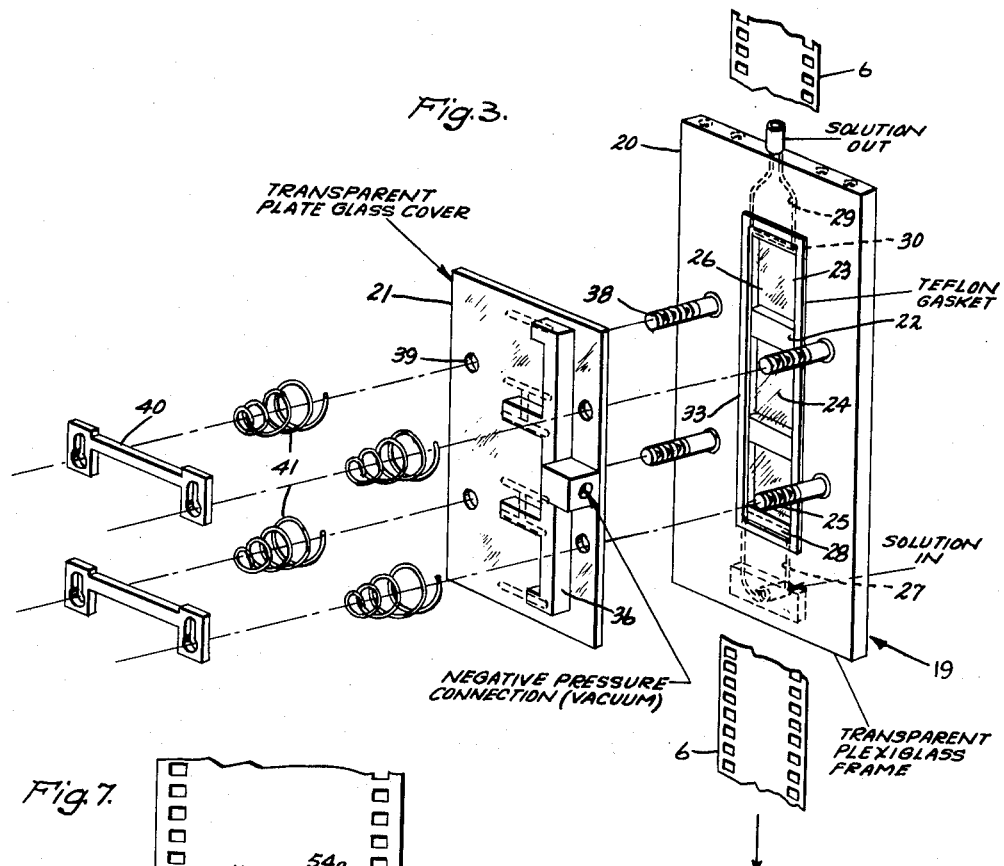

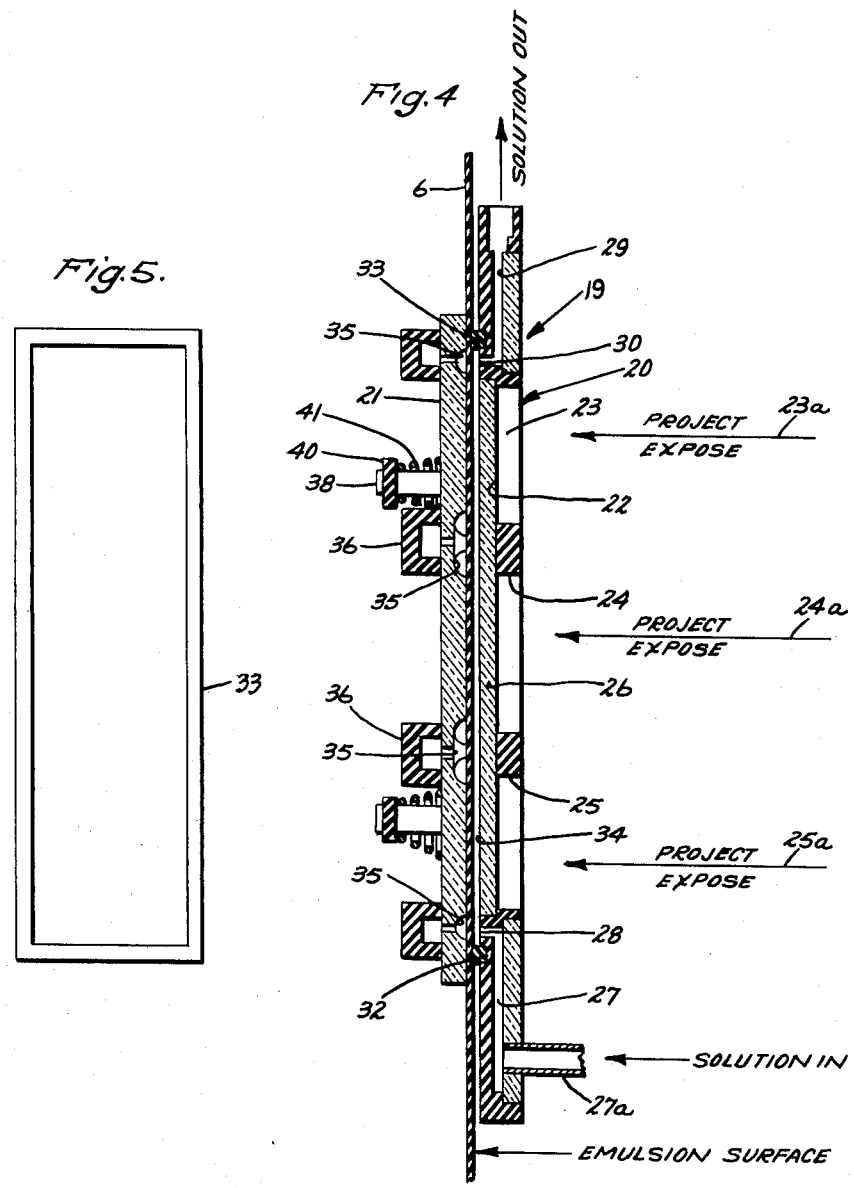

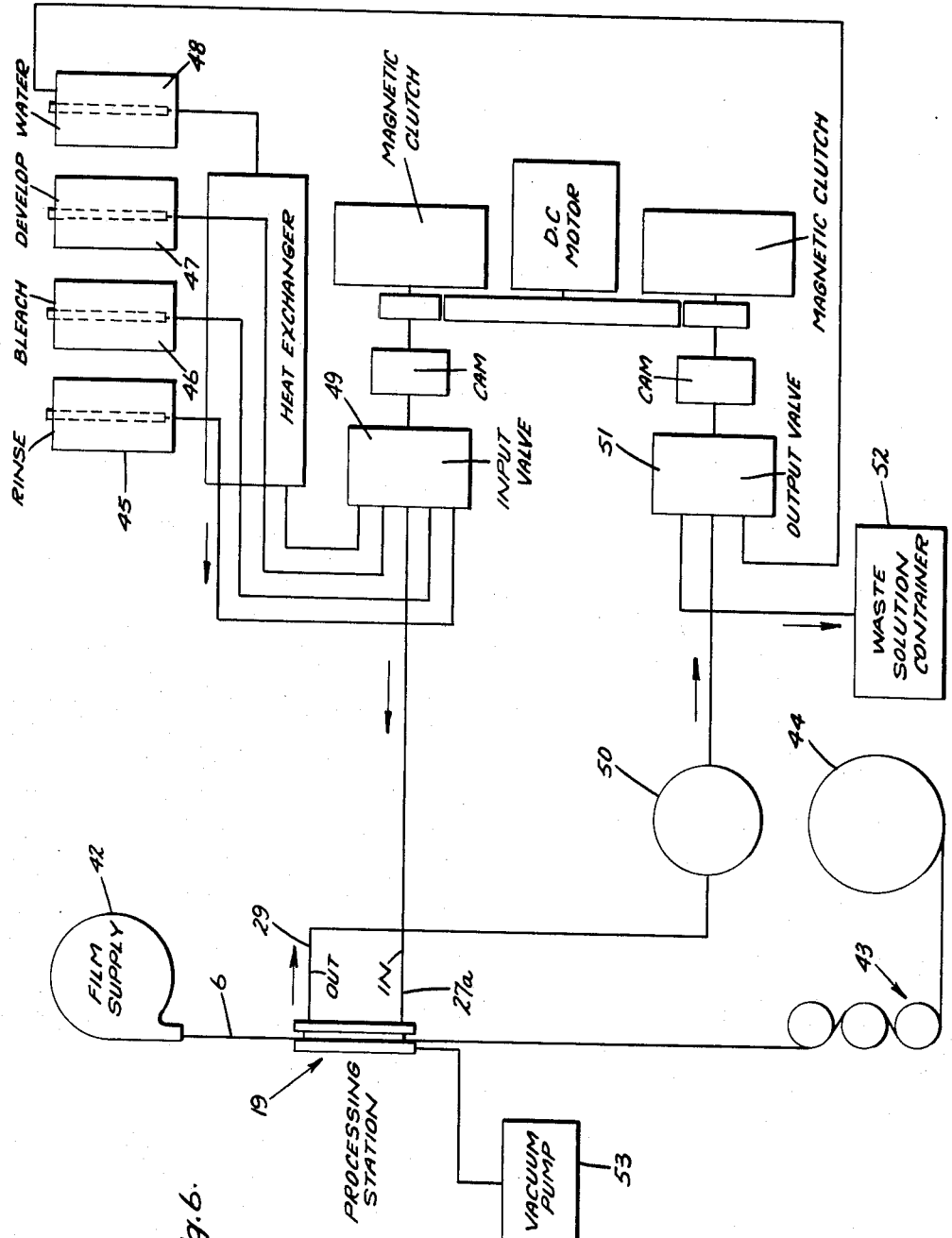

3,200,724
APPARATUS FOR ACCURATE FORMATION AND PRESENTATION OF A VISUAL DISPLAY
Joseph A. Stamm, Carl E. Rumsey, and Ray F. Franke, Fort Wayne, Ind., assignors to International Telephone and Telegraph Corporation, Nutley, N.J., a corporation of Maryland
Filed Nov. 29, 1962, Ser. No. 240,948
10 Claims. (Cl. 95—12)

The present invention relates to an apparatus for accurate formation and presentation of a visual display and more particularly to an apparatus for exposing film to an optical image, developing the film, and accurately projecting the image on the developed film, all of these operations being performed without film movement.

There are instances in which it is desired to provide a large area visual display of transitory information, such as a succession of radar plots superimposed upon fixed information such as a map overlay. To accomplish this objective, it has been proposed that the transitory information be formed at a first location on a continuous length of photographic film which is then transported to a second location at which the image is projected onto a large area viewing screen, the fixed information being simultaneously projected onto the screen with separate projection apparatus. It is a requirement of such a projection system that the transitory and fixed images be in highly accurate registry when displayed on the viewing screen. While the two sets of projection apparatus may be accurately aligned with reference to the screen, due to dimensional and perforation inaccuracies in conventional perforated film, conventional techniques of perforated film handling are not capable of satisfying the stringent registration requirements for the two images. Since the fixed image is commonly projected from a slide and may thus be accurately prefocused on the viewing screen, it is desirable to provide means for forming an image of the transitory information on conventional photographic film and projecting the film image with repeatable accuracy which is independent of dimensional stability of the film itself and inaccuracies in the transport mechanism by which the film is incrementally advanced for the purpose of forming different images.

In order to obtain repeatable accuracy in the projection of transitory images, it has been proposed in prior apparatuses and methods to form an image on perforated photographic film at a first location and then transporting the film to a projecting location by means of mechanism which is capable of locating the film such that repeated projections of the film image will be obtained with substantial accuracy. While such a prior art arrangement is capable of providing repeatable accuracy in the projected image, a certain amount of time as well as the use of specially designed transport mechanism are required. In contrast, the present invention eliminates these requirements in the accurate presentation of a desired visual display.

It is, therefore, an object of this invention to provide apparatus for exposing an area of photographic film to an optical image, developing the image on the film, and then projecting the image, all of these steps being performed without film movement.

It is another object of this invention to provide an apparatus for developing an optical image, projecting this image along an optical axis and focusing the same into an image plane, exposing a stationary film located in said image plane to the projected image, immediately developing the image on the film, and thereafter projecting the image on the film along the same optical axis onto a screen or the like for display.

The objects of the invention are broadly attained by means of a transparent film casing having a chamber therein, a segment of photographic film being positioned against movement in said casing and in communication with said chamber, means for sequentially passing different processing fluids through said chamber in contact with said film for developing the latter, means for exposing at least a portion of the film located in said chamber to an optical image which is directed through said casing, means for developing the film after exposure, and means for directing light through said casing and developed film for optically projecting the developed image of said film on a visual display screen or the like, all of these operations being performed without movement of the film. In a total system having two projection apparatuses in which one of the apparatuses supplies basic fixed overlay displays and the other displays of transitory information, the transitory information may be supplied by means of a cathode ray tube and lens optics which are accurately optically aligned with the basic projection apparatus with reference to an ultimate display screen. By using the film apparatus hereinabove broadly described in conjunction with the cathode ray tube and its lens system, the projection of the transitory information recorded on the film onto the display screen will be accurately aligned with the display from the basic projection apparatus, since the film is not moved at any time between the exposure and projection steps. Thus, accurate registry of the transitory image with the basic image on the display screen is assured regardless of any accuracies in the dimensions of the film or any mechanism by which the film is sequentially transported for the development of new images.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic illustration in perspective showing the projection system in which the present invention is employed;

FIG. 2 is a diagrammatic illustration in perspective of an embodiment of this invention whereby color displays of transitory information may be presented;

FIG. 3 is an exploded view in perspective of the film casing diagrammatically illustrated in FIGS. 1 and 2;

FIG. 4 is a longitudinal sectional view of the film casing in assembled form;

FIG. 5 is a plan view of the gasket used in sealing the processing chamber of the film casing of FIGS. 3 and 4;

FIG. 6 is a diagrammatic illustration of the film-processing system employed in this invention; and FIG. 7 is a view of a film segment on which typical images have been developed for the projection of colored displays.

Referring now to FIG. 1 of the drawings, there is shown a large area viewing screen 1 upon which is optically projected by means of conventional projection apparatus 2 a fixed image 3, shown here as being a system of rectangular grid coordinates. The fixed image 3 may be projected from a conventional slide 4, and it will be readily understood may take any desired form other than the grid coordinates shown, such as a map. For projecting a second, transitory image 5 upon the screen 1 superimposed upon the fixed image 3 and in accurate registry therewith, a continuous length of photographic film 6 is provided. Image 7 is formed on the film 6 and is projected onto the screen 1 as image 5 by means of a light projector 8 positioned in the dashed line position 8a.

The projection apparatuses 2 and 8, respectively, during the time of projecting images on the screen 1, are accurately aligned and supported with respect to each other such that image-information fed to the projector 8 will always be projected onto the screen 1, at a desired location with respect to the image 3 from projector 2. The optical axes of the two projectors 2 and 8 preferably are parallel and at right angles to the plane of screen 1 such that "keystoning" can be avoided. If the projector 8 occupies the center position with respect to screen 1, this requires projector 2 to be offset slightly to one side as shown. In order to prevent "keystoning" of the image from projector 2, the technique of "image translation" is used wherein the projection lens 2a is slightly translated to one side in the direction which centers properly the image 3 on the screen 1, the optical axis of lens 2a being perpendicular to screen 1.

Before the image 7 is projected onto the screen 1, however, it must first be formed on the film 6. This is accomplished by means of an image generator, such as the cathode ray tube 9, which has suitable lenses associated therewith for directing and focusing an optical image onto the film 6. The film 6 is thereby exposed to the image, immediately following which the film is developed to provide the image 7. During the exposure of the film 6, the projector 8 is located in its full-line position. Immediately following the development of the film image 7, the projector 8 is moved to its dashed line position 8a, as explained before, for projecting the image 5 on the screen 1.

Of importance is the fact that the projection apparatus 2 is accurately aligned with the cathode ray tube 9 and its related lens system (not shown) such that if the image generated by the cathode ray tube 9 were projected directly onto the screen 1, it would coincide precisely with the image 5. It is thereby apparent that the film 6 constitutes a storage medium whereby the image on the face of the cathode ray tube 9 may be permanently recorded and then projected onto the screen 1 in precisely the same position as it would appear had the image been directly displayed from the face of the tube 9.

By exposing, developing and projecting the film 6 without any movement thereof, precise, repeatable projection of the film image onto the screen 1 is assured, this accuracy and the means by which it is accomplished constituting an important feature of this invention.

Referring to FIG. 2, a slightly different embodiment of the invention is illustrated wherein a single image on the face 10 of the cathode ray tube is multiplied into three identical images by the three lenses 11a, 11b and 11c which are focused onto the three fields or areas 12a, 12b and 12c of the film 6. Shutters 13a, 13b and 13c interposed between the lenses 11a, 11b and 11c and the film 6 may be selectively operated to determine which of the film areas 12a, 12b and 12c are exposed. A suitable motor indicated by the numeral 14 may be used to operate selectively the shutters 13a, 13b and 13c.

The light projector 8 (FIG. 2) may take the form of a dichroic module having light beam outputs of red, green and blue, respectively, from the lens apertures 15a, 15b and 15c. The axes of these three beams coincide with the optical axes of the lenses 11a, 11b and 11c when the unit 8a is moved to the dashed line position such that the light beams cover the respective film fields 12a, 12b and 12c. Three objective lenses 16a, 16b and 16c superimpose in precise registry the projected images from the film fields 12a, 12b and 12c onto the screen 1 such that, as will be explained hereinafter, a colored display of the monochromatic image emitted by the cathode ray tube 9 may be obtained.

In FIG. 2, the light projector 8 is movable accurately between the full-line position and the dashed line position 8a, and includes a source 17 of white light, a condensing lens 18, and a dichroic module which divides the beam of white light into three beams of the colors red, green and blue, respectively, these latter beams emerging from the apertures 15a, 15b and 15c. While this particular projector is shown, any beam-forming projector capable of producing three beams of light positioned as described may be used. Also, if the presentation of different colors is not required, a projector which emits a single beam of white light covering the three fields 12a, 12b and 12c may be used without departing from the scope of this invention.

An essential feature of this invention resides in the film casing or device, generally indicated by the numeral 19, in the use of which the film 6 may be exposed, developed and projected while remaining stationary. This device 19, the tube 9, lenses 11a, 11b, 11c and 16a, 16b, 16c are all fixedly mounted on suitable framework (not shown) in proper optical alignment as shown in FIG. 2 and, as already explained, the projector 8 being movably mounted on a suitable platform 8b for movement between the dashed and full-line positions shown. These same elements are also enclosed in a cabinet or housing (not shown) which is tightly sealed against ambient light. The objective lenses 16a, 16b and 16c, of course, must extend through a wall of the cabinet in order to project the images on the externally located screen.

The film-holding device 19, as shown more clearly in FIGS. 3 and 4, comprises two superposed transparent plates 20 and 21 having the film 6 sandwiched therebetween. The plate 20 may be fabricated of any suitable optically transparent material such as glass or plexiglass. An elongated, rectangular cavity or depression 22 is formed in the left-hand face of plate 20, and three equally sized and shaped windows 23, 24 and 25 in longitudinally spaced relation are cut therethrough as shown. A rectangular, transparent, glass plate 26 is accurately fitted into the rectangular cavity 22 with its left-hand surface flush with the left-hand face of the plate 20, this plate 26 being tightly sealed around its perimeter to the plate 20 to prevent any leakage of fluid therearound.

In the lower end of the plate 19 as shown in FIG. 4 is provided a fluid passage 27 to which is connected a suitable conduit fitting 27a. The passage 27 terminates in an elongated slot 28 through the left-hand face of the plate 20 for a purpose which will be explained hereinafter.

In the upper portion of the plate 20 is another passage 29 having an elongated slot 30 which opens through the left-hand side of the plate 20.

In the left-hand surface of the plate 20, surrounding the rectangular glass insert 26 and on the outside of the two slots 28 and 30, is a rectangular groove 32 into which is intimately fitted and sealed a gasket 33 which is preferably fabricated of tetrafluoroethylene. As clearly shown in FIG. 4, this gasket 33 extends a short distance outwardly from the left-hand face of the plate 20. The width of the transparent insert 26 as well as the gasket 33 is made slightly smaller than the useful width of the film strip 6 such that the latter may be laid against the gasket 33 and extend beyond the edges thereof.

The glass plate 21 is mounted flat against the film 6 and yieldably urges the latter against the gasket 33 with enough force to provide a liquid-tight seal and chamber 34 between the emulsion side of the film 6 and the glass insert 26.

The right-hand face of the plate 21 is flat and is provided with a series of spaced channels or recesses 35 which are disposed adjacent the respective upper and lower edges of the three windows 23, 24 and 25. These channels 35 are connected to a manifold 36 which in turn may be connected to a vacuum pump for evacuating the cavities 35. By this means, the film 6 is drawn tightly against the right-hand face of the plate 21 and is thereby maintained in the image plane of the projecting and exposure optics already described in connection with FIG. 2.

Four posts 38 project outwardly from the plate 19 through companion apertures 39 in the plate 21 to receive on the ends thereof suitable snap rings or retainers 40. Compression springs 41 surround the respective posts 38 and bear at the opposite ends thereof against the retainers 40 and the plate 21 thereby forcing the latter toward the plate 20 and against the film 6. These springs 41 are strong enough to seal the film 6 to the entire perimeter of the gasket 33, but are not so strong as to prevent longitudinal movement of the film 6 between the plate 21 and the gasket 33.

The three portions of the plate 21 opposite the respective windows 23, 24 and 25 are transparent with the recesses 35 and manifold 36 lying outside these window areas.

The film device 19 just described is shown diagrammatically in FIG. 6 as being connected into a suitable system for processing the film. The film 6 is initially contained in a light-tight cartridge 42 from which it is threaded through the device 19 to a film drive 43 and eventually to a conventional take-up spool 44. The film drive 43 may be conventional such that the film 6 may be longitudinally advanced to any desired position in the device 19.

The inlet and outlet passages 27 and 29, respectively, of the device 19 are connected into a conduit system whereby different chemical solutions may be sequentially passed through the chamber 34 (FIG. 4) for the purpose of developing the emulsion on film 6. For conventional silver halide film, containers 45, 46, 47 and 48 have rinse, bleach, developing and water solutions, respectively, therein, and are connected by means of suitable piping to a control valve 49 which may be operated either manually or by means of automatic controls for feeding the various solutions through the developing chamber 34 in proper sequence and for proper durations for developing the film 6.

Flow of the liquid through the developing chamber 34 is produced by means of a suitable suction pump 50 having an outlet connected to a valve 51 by which the liquid may be selectively passed to a waste container 52 or returned to the water container 48 as desired.

A conventional vacuum pump 53 is connected to the manifold 36 (FIGS. 3 and 4) for maintaining the film 6 flat against the right-hand face of the plate 21.

Briefly stated, the film-holding device 19 of FIGS. 3 and 4 is used in the following manner. Assuming that the device 19 is fixedly mounted with respect to the tube 9 and optics 11a, 11b and 11c in a suitable light-tight cabinet, those portions of the film 6 in registry with the windows 23, 24 and 25 are briefly exposed to identical images along the axes represented by the arrows 23a, 24a and 25a (FIG. 4). Following this exposure, the system of FIG. 6 is operated such as to flow the various developing solutions through the developing chamber 34 in sequence and for the proper periods of time to develop the images on the film, the development of a silver halide film requiring about eight seconds. As the final step in this development of the film, water from the container 48 is flowed through the chamber 34.

With respect to the operation of the total system as illustrated in FIG. 2, the film 6 is exposed to the image of the tube face 10 through the respective windows 23, 24 and 25. Immediately following this exposure, the film processing system of FIG. 6 is operated as just described for developing the images in the three areas 12a, 12b and 12c (FIG. 2). The light source 8 is immediately moved to the dashed line position 8a whereupon blue, red and green light beams are projected through the areas 12a, 12b and 12c respectively. The objective lens systems 16a, 16b and 16c projects the three colored images from the field 12a, 12b and 12c onto a common area on the screen 1 as already explained. During the entire projection time, water is continuously circulated through the chamber 34, this water as well as the device 19 being transparent. Exposure, developing and projection all occur with the film 6 being held in the same stationary position.

In FIG. 7 is illustrated a typically developed film having different images thereon which may be displayed on the screen 1 in seven different colors, blue, red, green, yellow, magenta, cyan and white. The fields 12a, 12b and 12c on this film of FIG. 7 have opaque backgrounds with the images in the form of squares being transparent.

These transparent squares correspond to images presented by the cathode ray tube 9. The squares 54a, 54b and 54c are transparent, of the same size and in the same relative positions with respect to the respective fields 12a, 12b and 12c. When the primary colors blue, red and green are projected therethrough as already explained, a single white square will appear on the screen 1. Correspondingly, two transparent squares 55a and 55b of identical size and in precisely the same position in the respective fields thereof having blue and red light projected therethrough provide a magenta square on the screen 1. By the process of color addition, the other related transparent areas in the three fields 12a, 12b and 12c will produce the colors indicated in FIG. 7.

Referring now to FIG. 1, and reiterating that in a total system the fixed projection apparatus 2 is accurately aligned both electrically and optically with the cathode ray tube 9 and its projection optics, an image may be recorded on the film 6 and precisely displayed on the screen 1 without any possibility of misregistration. This is primarily due to the fact that movement of the film is eliminated between exposure and projection which provides the absolute in registration accuracy between the exposing image and projected object. Whenever it is desired to record new transitory information, the film is advanced to bring an unexposed section into the film-holding device 19 whereupon the process of exposure, developing and projecting may be repeated as previously explained. Film advancement does not require extreme accuracy, because the film to be used for projection is not moved after it is positioned in the film-holding device 19.

By constantly circulating water through the developing chamber 34 (FIG. 4), the conventional requirement of drying the film after development and prior to projection is obviated. Elimination of this drying time quite obviously permits quicker projection of the developed image. Also, it has been discovered that water in the chamber 34 improves the transmission of light through the film-holding device 19, and maintains the film cool.

It will be readily understood by a person skilled in the art that different film types as well as developing solutions may be used without departing from the spirit and scope of this invention.

While we have described above the principles of our invention in connection with specific apparatus, it is to be clearly understood that this description is made only by way of example and not as a limitation to the scope of our invention.

What is claimed is:

1. In apparatus for exposing and developing photographic film and projecting the image of the developed film, a film casing having front and rear flat plates which are superposed, one plate having a portion recessed away from the other plate to provide a chamber, a gasket sandwiched between said plates and surrounding said chamber, said gasket thereby spacing said plates apart, a length of film overlying said gasket and being interposed between said gasket and said other plate, resilient means yieldably urging said plates together and said film into fluid-sealing engagement with said gasket, said chamber having inlet and outlet ducts by means of which processing fluids may be circulated through said chamber, said plates being transparent in the regions which overlie said chamber, the surface of said other plate adjacent said film having a series of recesses therein, a manifold mounted on said other plate and having fluid connections to said recesses whereby the pressure in said recesses may be reduced for holding said film in intimate engagement with said other plate.

2. Apparatus according to claim 1 wherein:
 said film is held in intimate engagement with said other plate by vacuum means where:
  said recesses are connected to a manifold means and said manifold means is connected to a vacuum pump to introduce a suction to draw said film tightly against said other plate.

3. Apparatus for exposing and developing photographic film and projecting the image of the developed film comprising:

photographic film;

means for holding said film in a correct image plane, for exposing and for developing said film, and for projecting an image therefrom;

means for exposing said film, while in said image plane, to an optical image;

means for developing said film while in said image plane to form said image thereon; and means for optically projecting said image from said film into space while said film is held in said image plane, said holding means holding said film in a single position throughout the exposure, development, and projection thereof, and including:

a film casing having a chamber therein, at least a portion of said casing being transparent and in optical alignment with said chamber;

said exposing means comprising:
means for generating an optical image, comprising:
means for directing said image along an optical axis
and onto said film for exposing said film; and
means for exposing said film while in said casing;

said developing means comprising:
means to form said image on said film,
means for developing said film while in said casing,
means for conveying film-processing fluids and for conducting a liquid coolant to and through said chamber, and
means for locating said film in said chamber in contact with said fluids and said liquid coolant; and said projecting means comprising:
means for projecting said image along an extension of said optical axis, and
a projector device movable selectively into and out of registry with said optical axis of said image plane;

said holding means positioning at least a segment of said film against movement in said casing and in communication with said chamber;

said exposing means exposing at least a portion of said film located in said chamber to an image which is directed through said casing;

said conveying means comprising:
conduit means for sequentially passing different ones of said processing fluids through said chamber in contact with said film for developing the latter;

said developing means further including:
said conduit means and said film casing for developing said film after exposure; and said projecting means including:
means for directing light through said casing and said film for optically projecting said image as developed on said film.

4. Apparatus according to claim 3, wherein:
said film casing includes:
front and rear superposing cover plates, one of said plates having a portion thereof recessed away from the other plate to provide a chamber thereby; where
said plates each have transparent portions, respectively, which are thus optically registered with said chamber; and where
said film is interposed between said plates and in communication with said chamber.

5. Apparatus according to claim 4, wherein:
said holding means position said film in intimate engagement with the said other plate; and
said film casing includes:
means for sealing said film over said chamber to prevent leakage of said processing fluids and said liquid coolant from said chamber.

6. Apparatus according to claim 5, wherein:
said film casing includes:
means for tractably clamping said plates onto said film;
and further comprising:
means for selectively moving said film between said plates.

7. Apparatus according to claim 6, comprising:
a gasket interposed between said plates and surrounding said chamber;
said gasket being engaged by and interleaving said plates; where
said film overlies said gasket being interposed between said gasket and said other plate;
said tractably clamping means comprising:
resilient means for joining together said plates and said film into fluid- and liquid-sealing engagement with said gasket; and
said chamber having inlet and outlet ducting means for the passage of said processing fluids and said liquid coolant into and out of said chamber.

8. Apparatus according to claim 7, wherein:
said exposing means includes:
an optical-image generator fixedly positioned with respect to said film casing, and
a lens means for focusing an image being said image from said generator onto said film in said chamber; combined with
said light-directing means including:
a light source which is selectively movable into a first position in alignment with said optical axis between said generator and said casing whereby light may be directed through said image on said film and into a second position removed from said alignment.

9. Apparatus according to claim 7, wherein:
said exposing means includes:
an optical-image generator fixedly positioned with respect to said film casing, and
a lens means for focusing a plurality of spaced-apart images, said images being identical to each other, onto said film in said chamber; and
said light-directing means including:
a light source which is selectively movable into a first position in alignment with said optical axis between said generator and said casing whereby light may be directed through said plurality of images on said film and into a second position removed from said alignment.

10. Apparatus according to claim 7 wherein:
said resilient means comprise:
compression springs placed between said plates to seal said film to the perimeter of said gasket interposed between said plates.

References Cited by the Examiner

UNITED STATES PATENTS

| | | | |
|---|---|---|---|
| 2,047,002 | 7/36 | Cantwell | 88—24 |
| 2,446,668 | 8/48 | Tuttle | 95—14 |
| 2,473,174 | 6/49 | Pifer | 95—14 |
| 2,586,772 | 2/52 | Ashby | 95—74 X |
| 2,688,278 | 9/54 | Tuttle | 95—14 |
| 2,712,266 | 7/55 | Cherouvrier | 88—24 |

JOHN M. HORAN, *Primary Examiner.*

NORTON ANSHER, *Examiner.*